T. R. MARKILLIE.
Tire Tightener.

No. 78,461.

Patented June 2, 1868.

Witnesses:

Inventor:
Thomas R. Markillie
by D. E. Somes & Co
his Attorneys

United States Patent Office.

THOMAS R. MARKILLIE, OF WINCHESTER, ILLINOIS.

Letters Patent No. 78,461, dated June 2, 1868; antedated May 27, 1868.

IMPROVEMENT IN TIGHTENING WHEEL-TIRES.

The Schedule referred to in these Letters Patent and making part of the same.

TO ALL WHOM IT MAY CONCERN:

Be it known that I, THOMAS R. MARKILLIE, of Winchester, in the county of Scott, and State of Illinois, have invented a new and improved Method of Fitting and Tightening the Tires of Wheels; and I do hereby declare the following to be a full, clear, and exact description thereof, reference being had to the annexed drawing, making part of this specification, in which—

In all the figures like parts are indicated by the same letters of reference.

Figure 1:
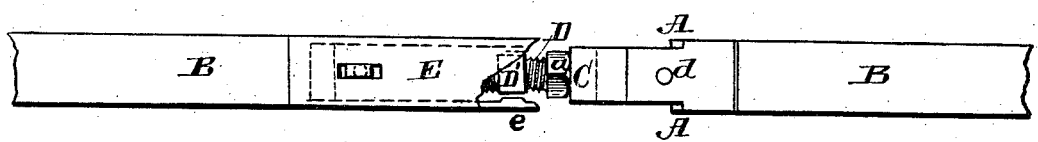
Figure 1 is an edge or top view of a portion of a wheel, showing a part broken away, to exhibit what would otherwise be hidden.
Figure 2:
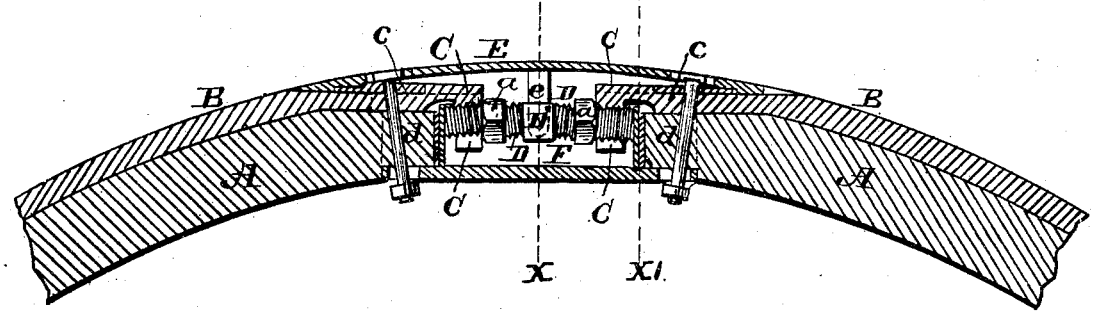
Figure 2 is a section, cut by a plane passing through the centre of the tire and felloes, in a direction at right angles with the axle.

In the drawing, A A are the felloes or wooden portion of the rim of a wheel. B B is the tire, surrounding the felloes, except where divided, as shown in the drawing. The contiguous ends of the tire are upset, and formed into heads C C, which are tapped to receive the threads of a screw, D D'. This screw is cut to the right and left, on each side of the central head D', with which it is in one piece, and the heads C C are tapped to correspond.

It will be seen that on turning the screw, by a wrench applied to the head D', the ends C C of the tire will be drawn together or forced apart, thus tightening or loosening the tire upon the felloes. Nuts a a are placed upon the screw, between the head D' and the ends C C, of the tire, which are to be screwed tight against said ends, when the adjustment is complete, to prevent the screw from shaking in the taps C C, and working loose or becoming stripped.

E is a metallic cap, covering the screw D D' and the ends of the tire, and forming a continuation of the curve of the same. This cap has side walls E', which extend towards the hub of the wheel, and are flush with the surface of the felloes and edge of the tire, these being cut away for the purpose, as seen in fig. 1.

Figure 3:
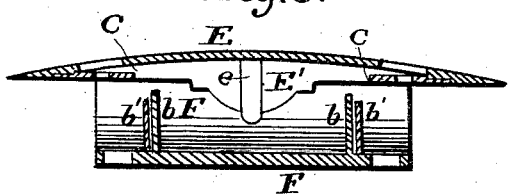
Figure 3 is a section on the same plane, showing parts detached.
Figure 4:
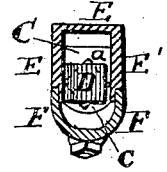
Figure 4 is a section on the line X X of fig. 2.
Figure 5:
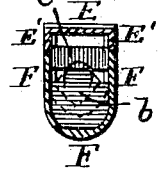
Figure 5 is a section on the line XI XI of same figure.

F is a metal shoe, made to fit the inside, and receive and enclose the ends of the felloes, forming, with the cap E, a close box, as shown separately in fig. 3, within which are the heads C C, the screw D D, and nuts a, keeping them from the dust, and protecting them from injury. The side walls of the shoe F and cap E meet each other, and are so fitted together by angular notches and curved edges, as seen in fig. 3, as to always maintain their relative positions.

In the shoe F are two partition-plates, b, made in one piece with the shoe. These receive the thrust of the ends of the felloes, as they are brought together, by the action of the screw D D', a plate, b', of wood, metal, or other suitable material of the proper thickness being interposed between the plate b and the ends of the felloes.

Plates c c rest on the tops of the ends of the tire, and abut, at their inner ends, against shoulders on the ends C C, their opposite or outer ends being received against similar shoulders on the under sides of the ends of the cap E.

The cap and shoe are secured together by means of bolts d d, the heads of which rest in slots in the cap E, which slots are chamfered along their sides so as to hold the head of the bolt while it is flush with the surface of the cap. The bolts pass through holes in the plates c c, through the ends of the tire and of the felloes, and through slots in the ends of the shoe F, where they are secured by nuts.

The slots in the cap E and shoe F are to allow the bolts to be moved with the tire and felloes, without being jammed when the cap is replaced after turning the screw D D'.

The side walls of the cap E are increased in thickness, as seen at e, so as to allow just enough room between them for the reception of the head D' of the screw, so that it cannot turn while the cap is on.

Having thus fully described my invention, what I claim therein as new, and desire to secure by Letters Patent, is—

The cap E, with side walls thickened at e, for the purpose described, the plates c c, the shoe F, and bolts d, arranged as described, combined with the tire B and felloes A, substantially as and for the purpose set forth.

In testimony whereof, I have signed my name to this specification in the presence of two subscribing witnesses.

THOS. R. MARKILLIE.

Witnesses:
G. W. CLARK,
J. H. BERRY.